United States Patent
Wu et al.

(10) Patent No.: US 12,495,970 B2
(45) Date of Patent: Dec. 16, 2025

(54) CALIBRATION DEVICE FOR AN INTRAORAL SCANNER

(71) Applicant: Qisda Corporation, Taoyuan (TW)

(72) Inventors: Tsung-Hsun Wu, Taoyuan (TW);
Ching-Ting Liu, Taoyuan (TW);
Yuan-Yu Hsiao, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 890 days.

(21) Appl. No.: 17/742,348

(22) Filed: May 11, 2022

(65) Prior Publication Data
US 2023/0240537 A1    Aug. 3, 2023

(30) Foreign Application Priority Data
Jan. 29, 2022   (CN) .......................... 202210110103.8

(51) Int. Cl.
*A61B 5/00*    (2006.01)
*A61C 9/00*    (2006.01)

(52) U.S. Cl.
CPC .......... *A61B 5/0062* (2013.01); *A61B 5/0088* (2013.01); *A61C 9/0053* (2013.01); *A61B 2560/0233* (2013.01)

(58) Field of Classification Search
CPC ................ A61B 5/0062; A61B 5/0088; A61B 2560/0233; A61B 2560/0223
USPC ........................................................ 356/4.02
See application file for complete search history.

(56) References Cited

U.S. PATENT DOCUMENTS

2018/0333232 A1    11/2018   Lee

FOREIGN PATENT DOCUMENTS

| CN | 108307890 A | 7/2018 |
| CN | 110132165 B | 7/2021 |

OTHER PUBLICATIONS

Translation of CN110132165, created Jul. 23, 2025, 8 pages. (Year: 2025).*
Office action of counterpart application by SIPO on May 10, 2025.

* cited by examiner

*Primary Examiner* — Daniel L Murphy

(57) ABSTRACT

A calibration device for an intraoral scanner is provided. The calibration device includes a base, a moving portion, a circuit board, and a sensor. The moving portion is disposed on the base. The moving portion is moveable on the base along an extending direction of the calibration device. The moving portion includes a driving structure, a position determining portion, and a target plate. The position determining portion is coupled to and driven by the driving structure. The position determining portion has a first feature portion and a second feature portion different from the first feature portion. The target plate is coupled to the position determining portion. The circuit board is disposed at one side of the moving portion. The sensor is disposed on the circuit board. The sensor is configured to detect the first feature portion and the second feature portion to determine a position of the moving portion.

11 Claims, 16 Drawing Sheets

CALIBRATION DEVICE FOR AN INTRAORAL SCANNER

This application claims the benefit of People's Republic of China application Serial No. 202210110103.8, filed on Jan. 29, 2022, the disclosure of which is incorporated by reference herein in its entirety.

TECHNICAL FIELD

The disclosure relates to a calibration device used in the field of dental instruments. More particularly, the disclosure relates to a calibration device for an intraoral scanner.

BACKGROUND

Modern people pay attention to oral health. As a result, the dentistry industry has flourished, and various related instruments have been developed. The intraoral scanner is one kind of the common oral instruments, and it can directly obtain the details of a patient's teeth by optical impression, which is convenient for impression taking and subsequent treatment. After leaving the factory or using for a period of time, the accuracy of the intraoral scanner will decrease and need to be corrected. Typically, a 3D spatial coordinate of a known object can be established using the intraoral scanner for comparison when scanning actual objects in the future. There are two general approaches. One is to use static objects of known volume. The other is to use a dynamic movement kit with a known moving path, and it constructs a dynamic calibrator for the intraoral scanner, which includes rotating objects and charts for photographing of the intraoral scanner to establish the 3D spatial coordinates.

SUMMARY

The disclosure relates to a calibration device for an intraoral scanner. The calibration device is one kind of the dynamic calibrators.

According to the disclosure, the calibration device for an intraoral scanner comprises a base, a moving portion, a circuit board, and a sensor. The moving portion is disposed on the base. The moving portion is moveable on the base along an extending direction of the calibration device. The moving portion comprises a driving structure, a position determining portion, and a target plate. The position determining portion is coupled to and driven by the driving structure. The position determining portion has a first feature portion and a second feature portion different from the first feature portion. The target plate is coupled to the position determining portion. The circuit board is disposed at one side of the moving portion. The sensor is disposed on the circuit board. The sensor is configured to detect the first feature portion and the second feature portion so as to determine a position of the moving portion.

Figure 1A:
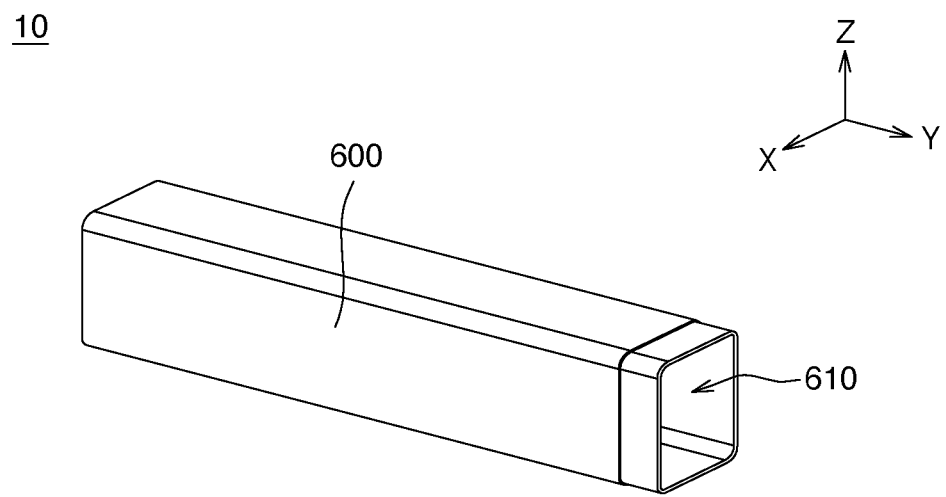
FIGS. 1A-1C schematically show a calibration device for an intraoral scanner.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments will be described more fully hereinafter with reference to accompanying drawings. In the accompanying drawings, similar reference numerals are used to identify similar elements. The elements may not be drawn to scale for the reason of clarity. In addition, some elements, features, and/or reference numerals may be omitted from some figures. In the specification, when one element is described to be "coupled to", "connected to", "disposed on", "disposed at one side of" . . . another element, there may or may not be an intervening element between the two elements. When one element is described to be "directly coupled to", "directly connected to", "directly disposed on", "directly disposed at one side of" . . . another element, there is no intervening element between the two elements. It is contemplated that the description and the accompanying drawings are provided for illustrative only, and not intended to result in a limitation. The elements and features of one embodiment can be beneficially incorporated in another embodiment without further recitation.

Figure 1B:
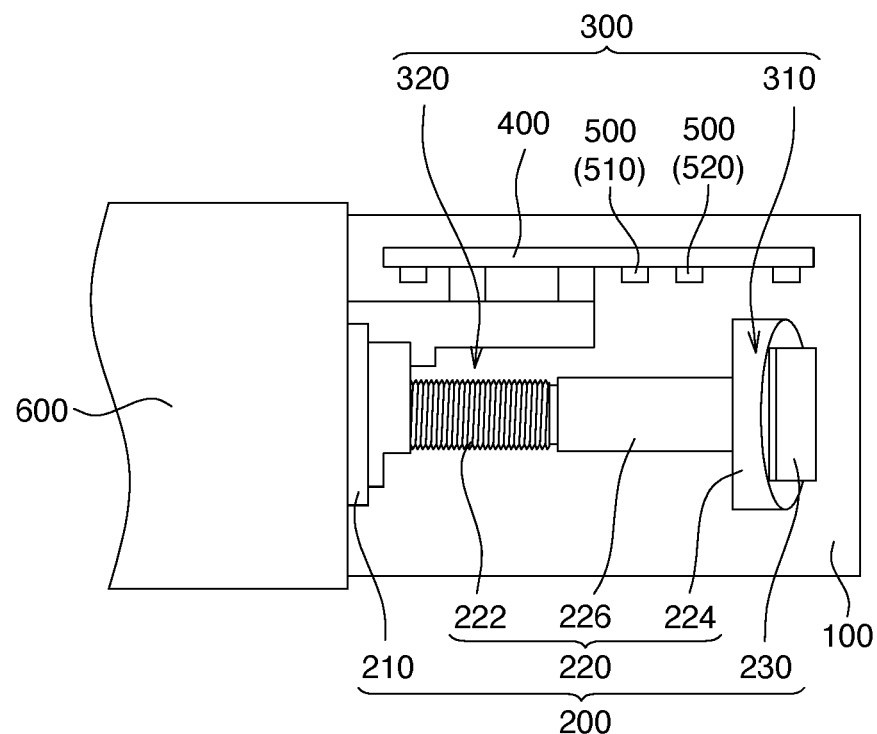
Figure 1C:
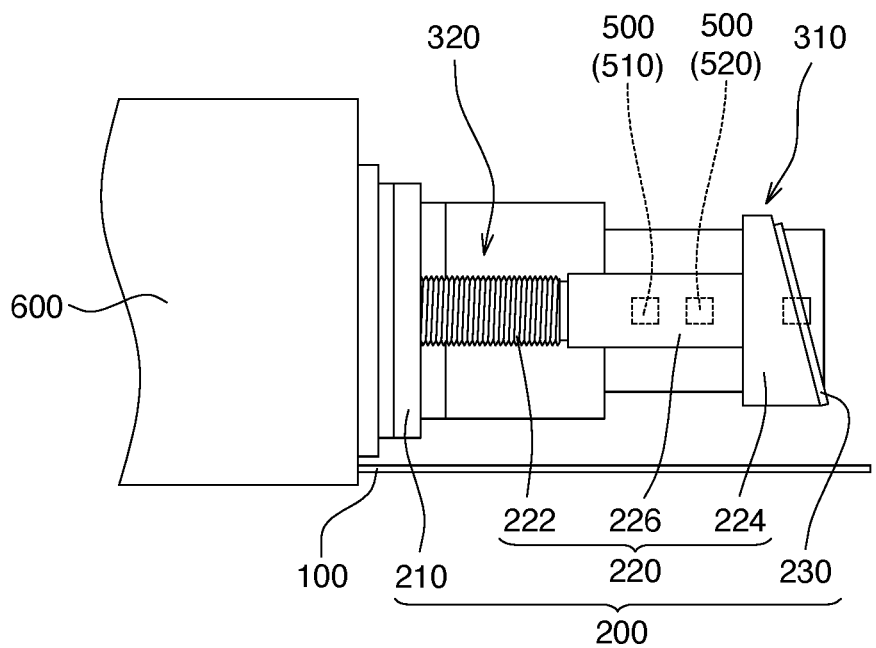

Referring to FIGS. 1A-1C, an exemplary calibration device 10 for an intraoral scanner is shown. The calibration device 10 comprises a base 100, a moving portion 200, a circuit board 400, and a sensor 500. The moving portion 200 is disposed on the base 100. The moving portion 200 is moveable on the base 100 along an extending direction of the calibration device 10 (Y direction in FIGS. 1A-1C). The moving portion 200 comprises a driving structure 210, a position determining portion 220, and a target plate 230. The position determining portion 220 is coupled to and driven by the driving structure 210. The position determining portion 220 has a first feature portion 310 and a second feature portion 320 different from the first feature portion 310. The target plate 230 is coupled to the position determining portion 220. The circuit board 400 is disposed at one side of the moving portion 200. The sensor 500 is disposed on the circuit board 400. The sensor 500 is configured to detect the first feature portion 310 and the second feature portion 320 so as to determine a position of the moving portion 200.

More specifically, the driving structure 210 of the moving portion 200 can drive the position determining portion 220 connected thereto to move back and forth on the base 100 along the extending direction of the calibration device 10 (Y direction in FIGS. 1A-1C), and further drive the target plate 230 to move back and forth. According to some embodiments, the driving structure 210 may be a motor, but the disclosure is not limited thereto.

According to some embodiments, the position determining portion 220 may comprise a screw 222 and an attaching portion 224. The screw 222 is coupled to the driving structure 210. The attaching portion 224 is coupled to the screw 222. The target plate 230 is attached to the attaching portion 224. The attaching portion 224 may have an inclined surface, and the target plate 230 may be attached to the inclined surface, but the disclosure is not limited thereto. In some embodiments, the position determining portion 220 further comprises a connecting portion 226 connecting the screw 222 and the attaching portion 224. According to some embodiments, at least one of the first feature portion 310 and the second feature portion 320 may be arranged on the screw 222. According to some embodiments, at least one of the first feature portion 310 and the second feature portion 320 may be arranged on the attaching portion 224. In some embodiments, the second feature portion 320 is different from the first feature portion 310 in at least one selected from the group consisting of a cross-sectional size, a shape, a color, a material, a roughness, and a magnetic characteristic, but the disclosure is not limited thereto. The position determining portion 220 have a plurality of feature portions 300, including the first feature portion 310 and the second feature portion 320. The position determining portion 220 may further have a third feature portion. In some embodiments, the third feature portion is different form the first feature portion 310 and the second feature portion 320. In some other embodiments, the third feature portion may be the same as one of one of the first feature portion 310 and the second feature portion 320. Similarly, the position determining portion 220 may have a fourth feature portion, a fifth feature portion, a sixth feature portion, and so on. The position determining portion 220 may be formed integrally, but the disclosure is not limited thereto.

According to some embodiments, the circuit board 400 may be perpendicular to the base 100, but the disclosure is not limited thereto. The sensor 500 is disposed on the circuit board 400. In FIGS. 1A-1C, two sensors 510 and 520 are exemplarily shown. However, the sensor number may be one or two or more. Arranging a plurality of sensors 500 on the same circuit board 400 can increase the accuracy, reduce the assembly error, simplify the design of the circuit board 400, and reduce the cost. The type of the sensor 500 is determined according to the difference between the feature portions. In some embodiments, each sensor 500 is selected from the group consisting of a light sensor, a mechanical sensor, and a magnetic sensor, but the disclosure is not limited thereto. According to some embodiments, the position of the moving portion 200 is determined according to different electrical signals generated by the sensor 500 when the sensor 500 senses the first feature portion 310 and senses the second feature portion 320. The electrical signals may be, for example, potential signals, but the disclosure is not limited thereto.

According to some embodiments, the calibration device 10 may further comprise a housing 600 receiving the base 100, the moving portion 200, the circuit board 400, and the sensor 500. The housing 600 has an opening 610 for insertion of the intraoral scanner.

FIGS. 2A-2B to FIGS. 14A-14B schematically show embodiments for the feature portions and the sensors of various calibration devices.

Figure 2A:
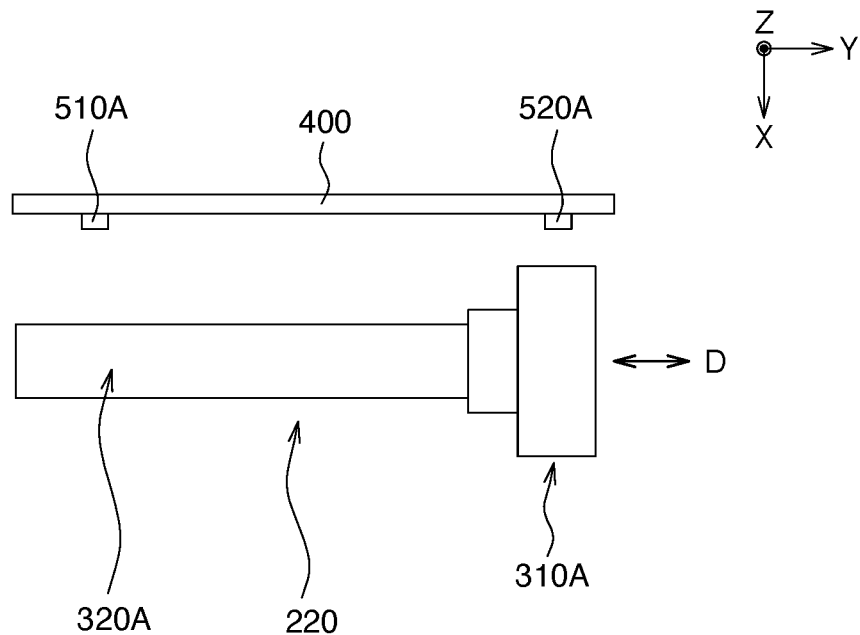
FIGS. 2A-2B to FIGS. 14A-14B schematically show embodiments for the feature portions and the sensors of various calibration devices.
Figure 2B:
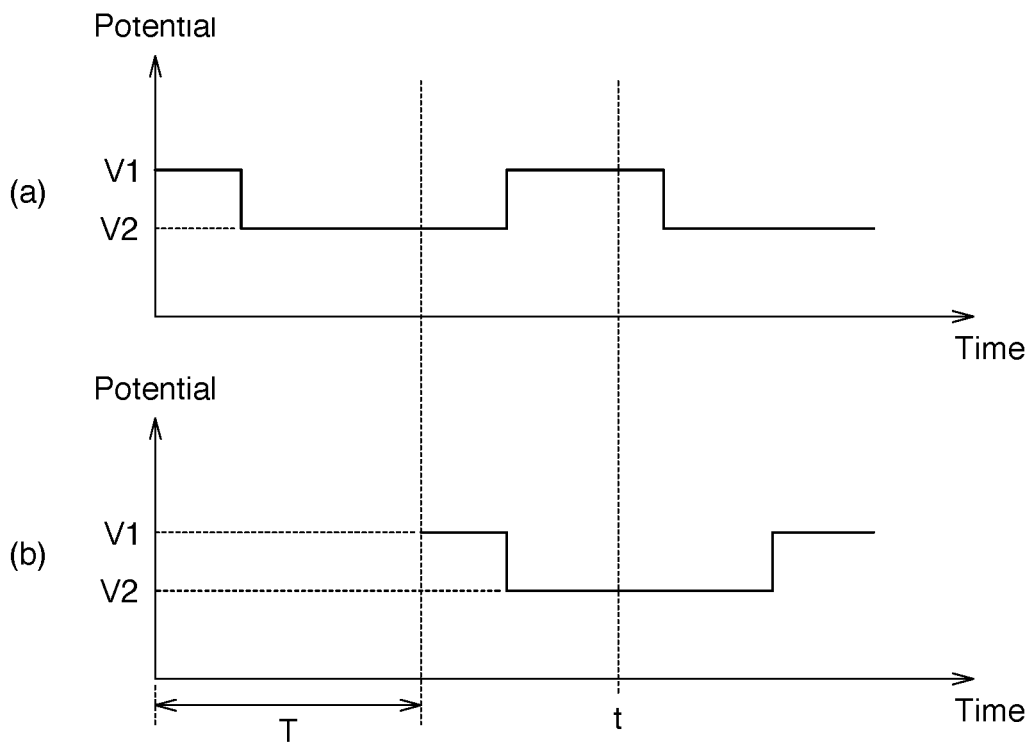

Referring to FIGS. 2A-2B, a combination of feature portions and sensors of a calibration device and an example of a sensing result thereof are shown. FIG. 2A schematically shows a position determining portion 220 and feature portions thereon as well as two sensors 510A and 520A arranged correspondingly. A moving direction D of the position determining portion 220 is parallel to the extending direction of the calibration device 10. In this embodiment, the first feature portion 310A and the second feature portion 320A have different cross-sectional sizes. Correspondingly, the two sensor 510A and 520A are light sensors. According to sensing results of the first feature portion 310A and the second feature portion 320A by the sensors 510A and 520A, the position of the moving portion 200 can be determined. For example, when the position determining portion 220 moves forward in the moving direction D (i.e., close to the opening 610, toward the right side of the figure), the sensor 510A obtains the potential change with time as shown in FIG. 2B(a) corresponding to the movement of the position determining portion 220, and the sensor 520A obtains the potential change with time as shown in FIG. 2B(b) corresponding to the movement of the position determining portion 220. The first feature portion 310A and the second feature portion 320A generate different potential signals corresponding, for example, to the potential V1 and the potential V2, respectively. A time difference T of the same potential signal between FIG. 2B(a) and FIG. 2B(b) represents the time which the moving portion 200 takes to pass a distance between the two sensors 510A and 520A, and a moving speed may be calculated accordingly. Alternatively, when the moving speed is known, the distance between the two sensors 510A and 520A can be calculated from the time difference T. Besides, according to a signal interval, a corresponding moving distance of the moving portion 200 can be calculated. In addition, at a time point t, it can be known, from FIG. 2B(a), that the second feature portion 320A of the position determining portion 220 has passed the position where the sensor 510A is located, and the sensor 510A senses a feature portion after the second feature portion 320A, and it can be known, from FIG. 2B(b), that the sensor 520A senses the second feature portion 320A. As such, the position of each element of the moving portion 200 (including the driving structure 210, the target plate 230, and so on) at the time point t can be obtained. Other details as described above may also be included in this embodiment, and will not be redundantly repeated herein.

Figure 3A:
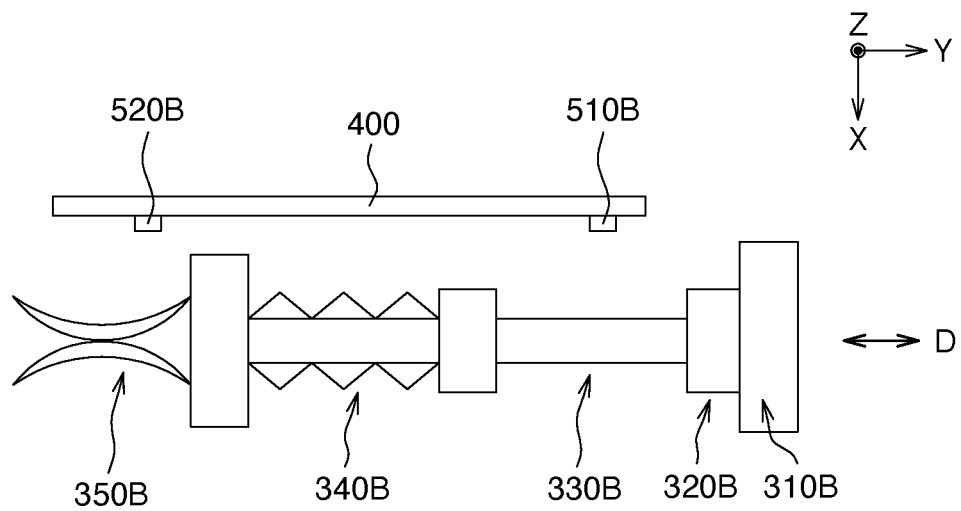
Figure 3B:
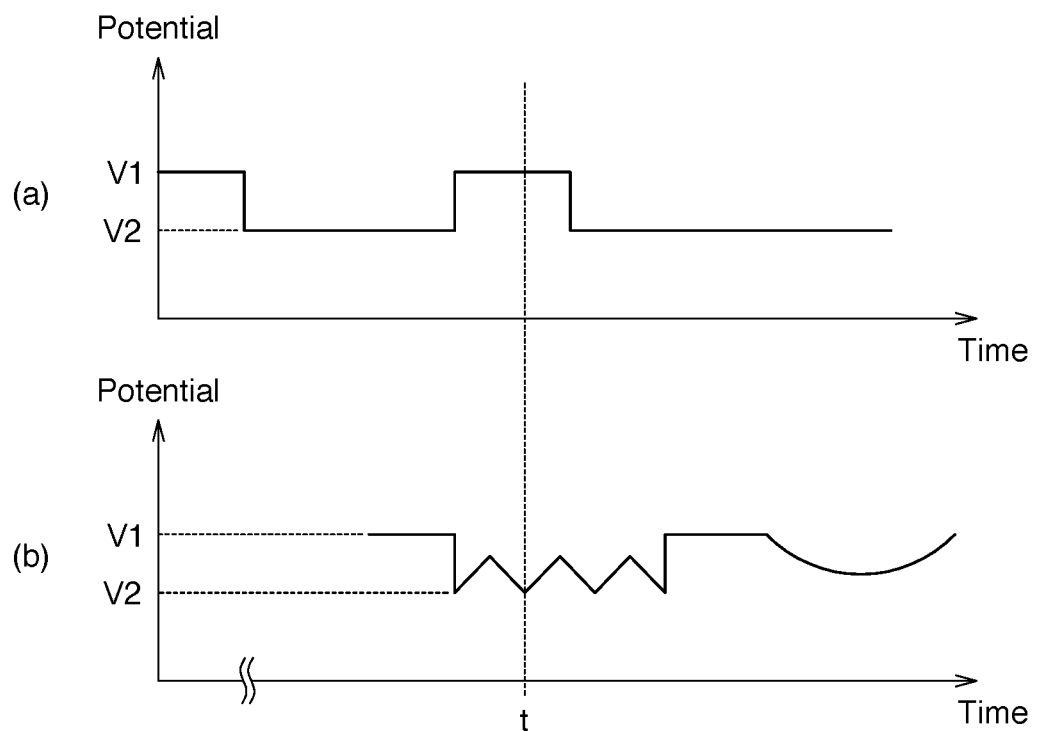

Referring to FIGS. 3A-3B, in this embodiment, the first feature portion 310B, the second feature portion 320B, the third feature portion 330B, the fourth feature portion 340B, and the fifth feature portion 350B have different shapes. Correspondingly, the two sensor 510B and 520B are light sensors. According to sensing results of any two or more of the first feature portion 310B to the fifth feature portion 350B by the sensors 510B and 520B, the position of the moving portion 200 can be determined. For example, when the position determining portion 220 moves forward in the moving direction D (i.e., close to the opening 610, toward the right side of the figure), the sensor 510B obtains the potential change with time as shown in FIG. 3B(a) corresponding to the movement of the position determining portion 220, and the sensor 520B obtains the potential change with time as shown in FIG. 3B(b) corresponding to the movement of the position determining portion 220. The first feature portion 310B to the fifth feature portion 350B generate different potential signals. According to a signal interval, a corresponding moving distance of the moving portion 200 can be calculated. In addition, at a time point t, it can be known, from FIG. 3B(a), that the sensor 510B senses the third feature portion 330B, and it can be known, from FIG. 3B(b) that the sensor 520B senses the fourth feature portion 340B. As such, the position of each element of the moving portion 200 (including the driving structure 210, the target plate 230, and so on) at the time point t can be obtained. Other details as described above may also be included in this embodiment, and will not be redundantly repeated herein.

Figure 4A:
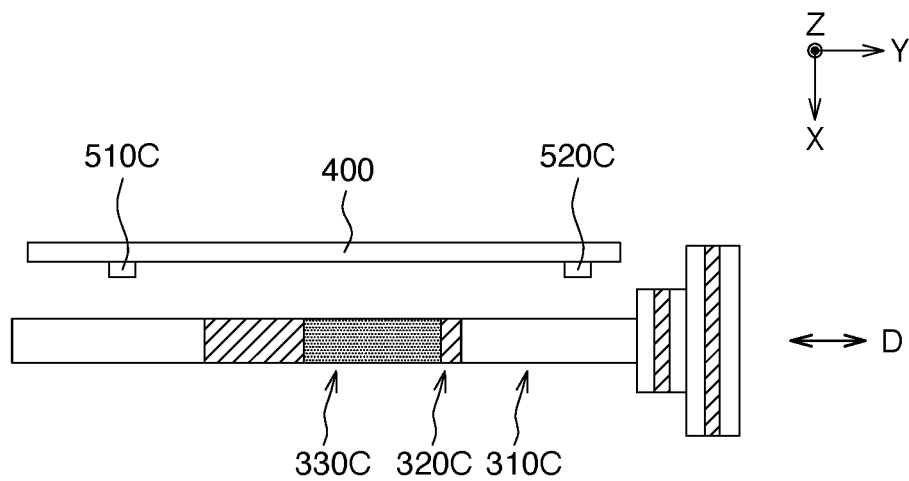
Figure 4B:
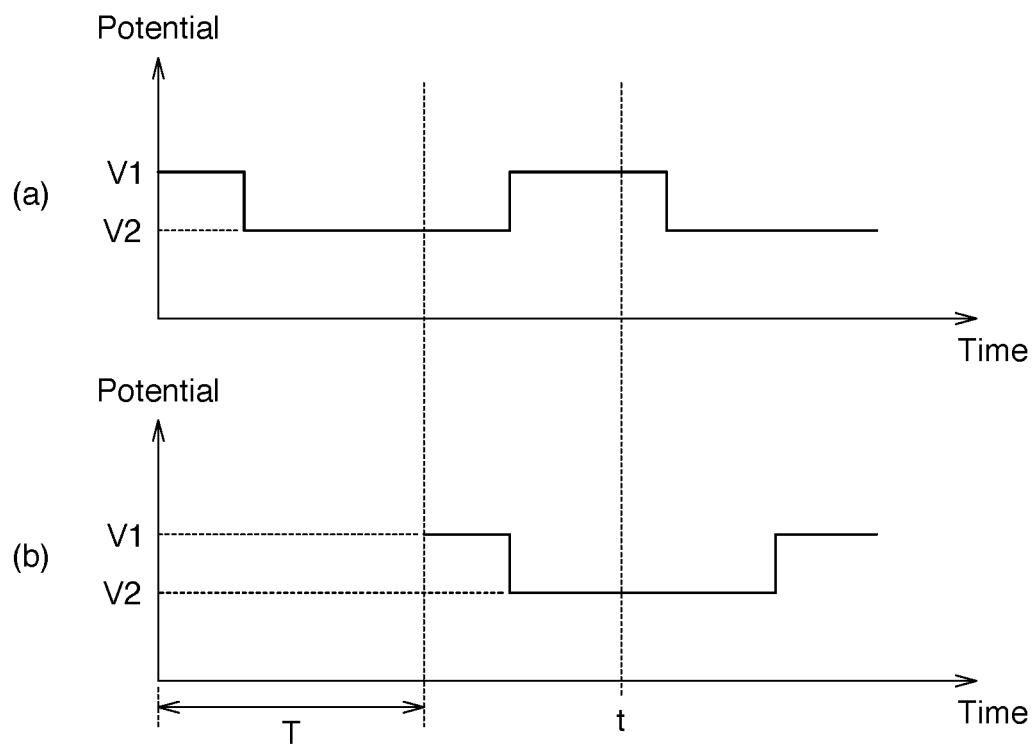

Referring to FIGS. 4A-4B, in this embodiment, the first feature portion 310C, the second feature portion 320C, and the third feature portion 330C have different colors, such as silver, black, and gold, respectively. Correspondingly, the two sensor 510C and 520C are light sensors. According to sensing results of any two or more of the first feature portion 310C to the third feature portion 330C by the sensors 510C and 520C, the position of the moving portion 200 can be determined. For example, when the position determining portion 220 moves forward in the moving direction D (i.e., close to the opening 610, toward the right side of the figure), the sensor 510C obtains the potential change with time as shown in FIG. 4B(a) corresponding to the movement of the position determining portion 220, and the sensor 520C obtains the potential change with time as shown in FIG. 4B(b) corresponding to the movement of the position determining portion 220. The first feature portion 310 to the third feature portion 330C generate different potential signals. A time difference T of the same potential signal between FIG. 4B(a) and FIG. 4B(b) represents the time which the moving portion 200 takes to pass a distance between the two sensors 510C and 520C, and a moving speed may be calculated accordingly. Alternatively, when the moving speed is known, the distance between the two sensors 510C and 520C can be calculated from the time difference T. Besides, according to a signal interval, a corresponding moving distance of the moving portion 200 can be calculated. In addition, at a time point t, it can be known, from FIG. 4B(a), that the 510C senses the third feature portion 330C, and it can be known, from FIG. 4B(b), that the sensor 520C senses the second feature portion 320C. As such, the position of each element of the moving portion 200 (including the driving structure 210, the target plate 230, and so on) at the time point t can be obtained. Other details as described above may also be included in this embodiment, and will not be redundantly repeated herein.

Figure 5A:
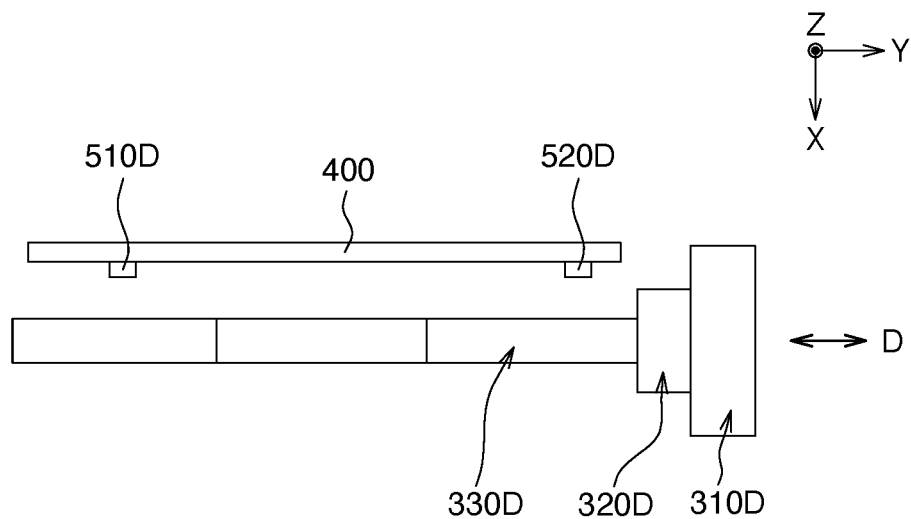
Figure 5B:
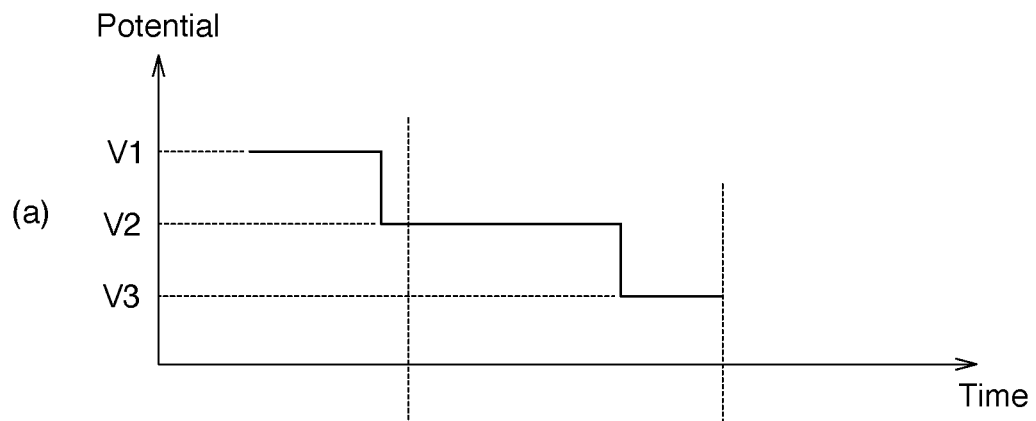
Figure 5B:
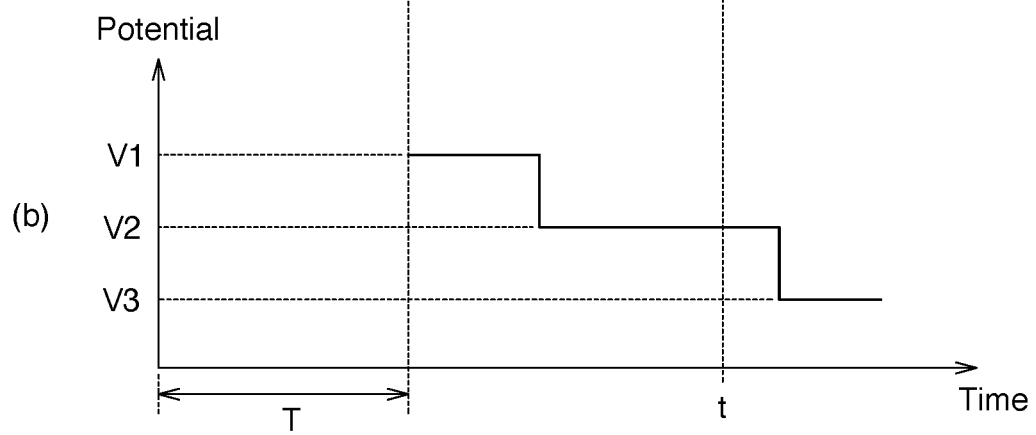

Referring to FIGS. 5A-5B, in this embodiment, the first feature portion 310D, the second feature portion 320D, and the third feature portion 330D have different materials. Correspondingly, the two sensor 510D and 520D are light sensors. According to sensing results of any two or more of the first feature portion 310D to the third feature portion 330D by the sensors 510D and 520D, the position of the moving portion 200 can be determined. For example, when the position determining portion 220 moves forward in the moving direction D (i.e., close to the opening 610, toward the right side of the figure), the sensor 510D obtains the potential change with time as shown in FIG. 5B(a) corresponding to the movement of the position determining portion 220, and the sensor 520D obtains the potential change with time as shown in FIG. 5B(b) corresponding to the movement of the position determining portion 220. The first feature portion 310D to the third feature portion 330D generate different potential signals corresponding, for example, to the potential V1, the potential V2, and the potential V3, respectively. A time difference T of the same potential signal between FIG. 5B(a) and FIG. 5B(b) represents the time which the moving portion 200 takes to pass a distance between the two sensors 510D and 520D, and a moving speed may be calculated accordingly. Alternatively, when the moving speed is known, the distance between the two sensors 510D and 520D can be calculated from the time difference T. Besides, according to a signal interval, a corresponding moving distance of the moving portion 200 can be calculated. In addition, at a time point t, it can be known, from FIG. 5B(a), that the sensor 510D senses the third feature portion 330D, and it can be known, from FIG. 5B(b), that the sensor 520D senses the second feature portion 320D. As such, the position of each element of the moving portion 200 (including the driving structure 210, the target plate 230, and so on) at the time point t can be obtained. Other details as described above may also be included in this embodiment, and will not be redundantly repeated herein.

Figure 6A:
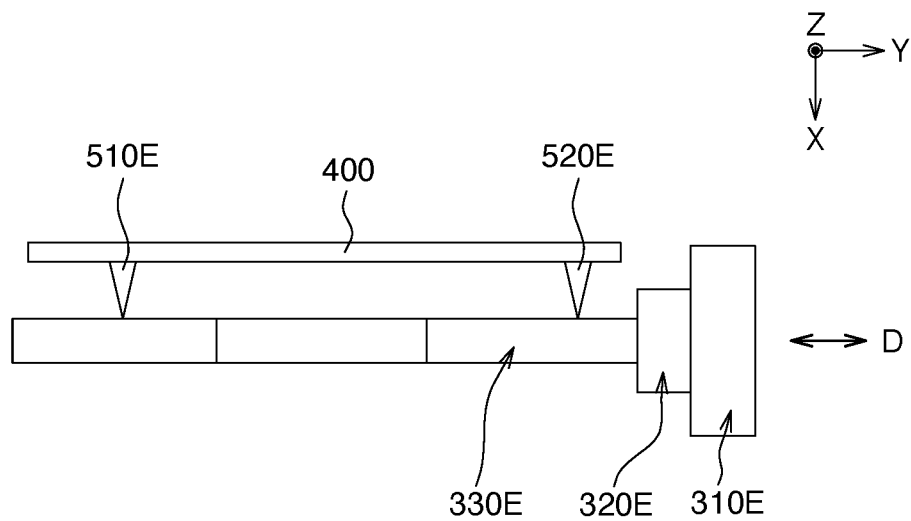
Figure 6B:
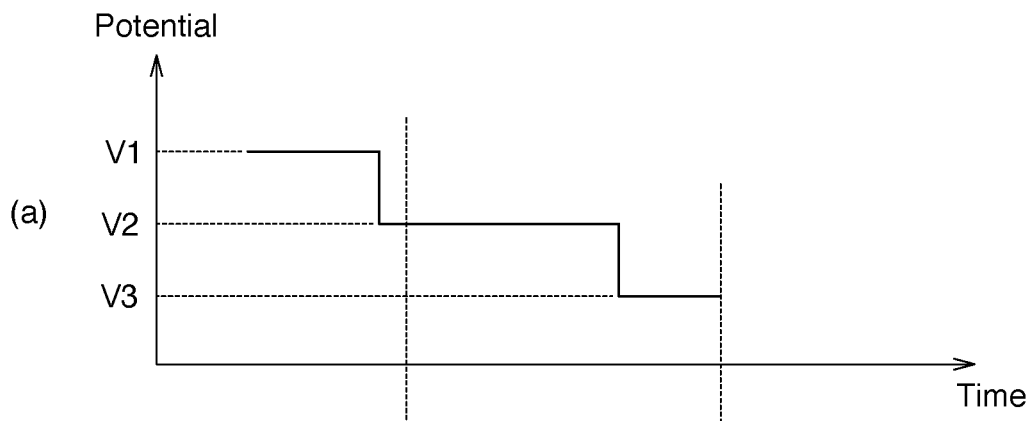
Figure 6B:
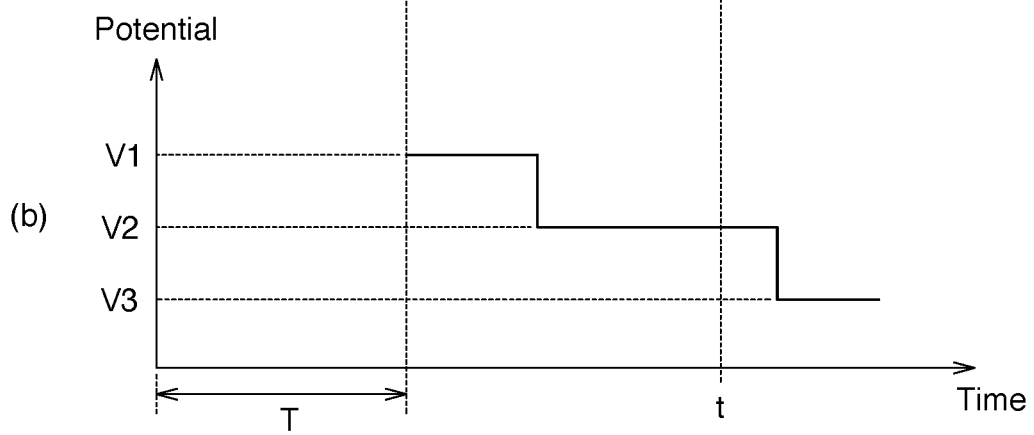

Referring to FIGS. 6A-6B, in this embodiment, the first feature portion 310E, the second feature portion 320E, and the third feature portion 330E have different roughnesses. Correspondingly, the two sensor 510E and 520E are mechanical sensors. For example, the sensors 510E and 520E may use a striker to sense the surface roughness of the contacted portion of the position determining portion 220, but the disclosure is not limited thereto. According to sensing results of any two or more of the first feature portion 310E to the third feature portion 330E by the sensors 510E and 520E, the position of the moving portion 200 can be determined. For example, when the position determining portion 220 moves forward in the moving direction D (i.e., close to the opening 610, toward the right side of the figure), the sensor 510E obtains the potential change with time as shown in FIG. 6B(a) corresponding to the movement of the position determining portion 220, and the sensor 520E obtains the potential change with time as shown in FIG. 6B(b) corresponding to the movement of the position determining portion 220. The first feature portion 310D to the third feature portion 330D generate different potential signals corresponding, for example, to the potential V1, the potential V2, and the potential V3, respectively. A time difference T of the same potential signal between FIG. 6B(a) and FIG. 6B(b) represents the time which the moving portion 200 takes to pass a distance between the two sensors 510E and 520E, and a moving speed may be calculated accordingly. Alternatively, when the moving speed is known, the distance between the two sensors 510E and the 520E can be calculated from the time difference T. Besides, according to a signal interval, a corresponding moving distance of the moving portion 200 can be calculated. In addition, at a time point t, it can be known, from FIG. 6B(a), that the sensor 510E senses the third feature portion 330E, and it can be known, from FIG. 6B(b), that the sensor 520E senses the second feature portion 320E. As such, the position of each element of the moving portion 200 (including the driving structure 210, the target plate 230, and so on) at the time point t can be obtained. Other details as described above may also be included in this embodiment, and will not be redundantly repeated herein.

Figure 7A:
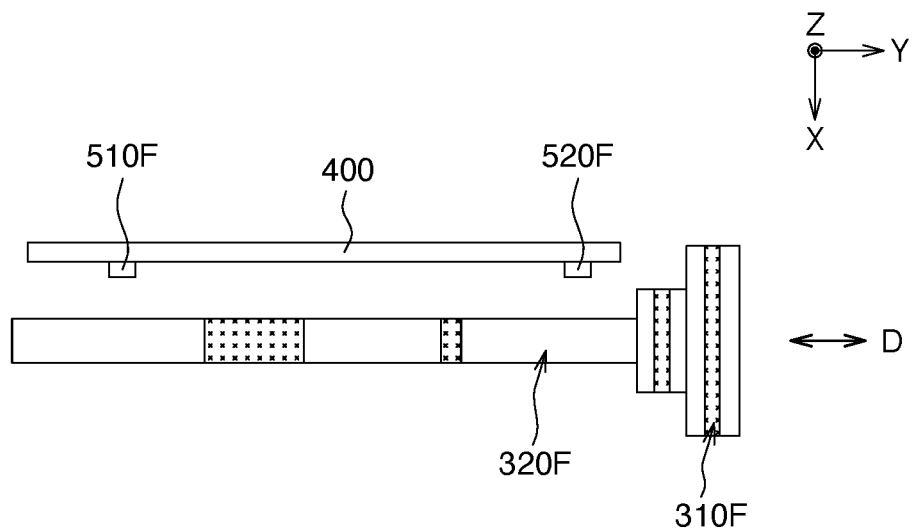
Figure 7B:
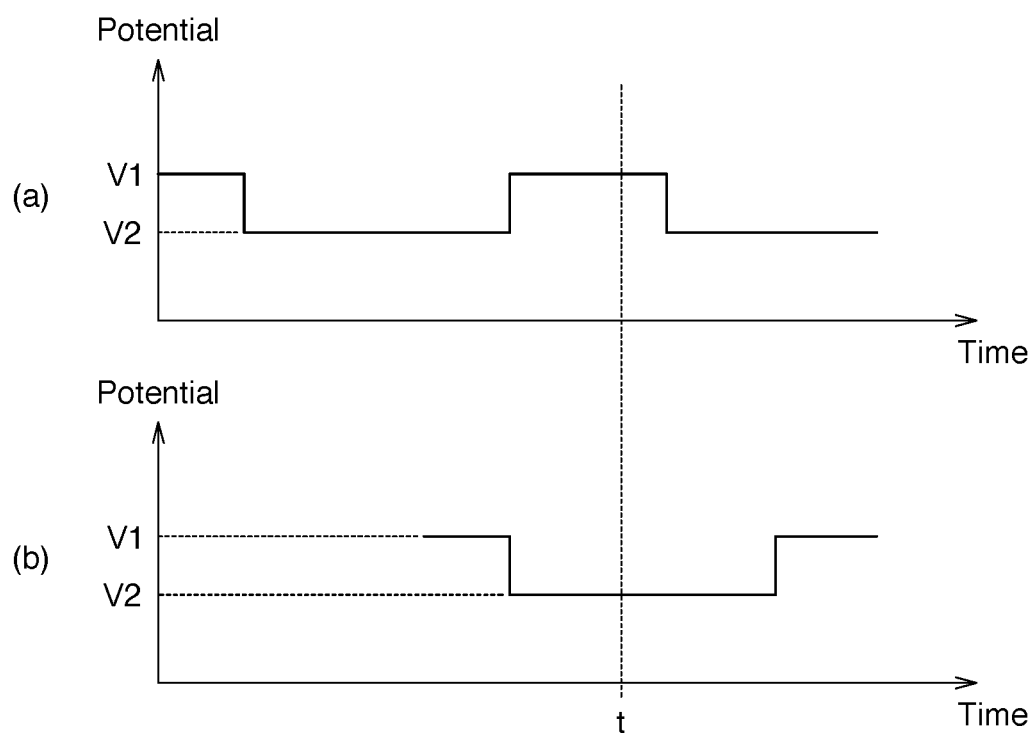

Referring to FIGS. 7A-7B, in this embodiment, the first feature portion 310F and the second feature portion 320F have different magnetic characteristics. Correspondingly, the two sensor 510F and 520F are magnetic sensors. For example, magnets or electromagnet coils may be arranged on the position determining portion 220, thereby generating different magnetic forces on different portions of the position determining portion 220, but the disclosure is not limited thereto. According to sensing results of the first feature portion 310F and the second feature portion 320F by the sensors 510F and 520F, the position of the moving portion 200 can be determined. For example, when the position determining portion 220 moves forward in the moving direction D (i.e., close to the opening 610, toward the right side of the figure), the sensor 510F obtains the potential change with time as shown in FIG. 7B(a) corresponding to the movement of the position determining portion 220, and the sensor 520F obtains the potential change with time as shown in FIG. 7B(b) corresponding to the movement of the position determining portion 220. The first feature portion 310F and the second feature portion 320F generate different potential signals corresponding, for example, to the potential V1 and the potential V2, respectively. A time difference T of the same potential signal between FIG. 7B(a) and FIG. 7B(b) represents the time which the moving portion 200 takes to pass a distance between the two sensors 510F and 520F, and a moving speed may be calculated accordingly. Alternatively, when the moving speed is known, the distance between the two sensors 510F and 520F can be calculated from the time difference T. Besides, according to a signal interval, a corresponding moving distance of the moving portion 200 can be calculated. In addition, at a time point t, it can be known, from FIG. 7B(a), that the second feature portion 320A of the position determining portion 220 has passed the position where the sensor 510F is located, and the sensor 510F senses a feature portion after the second feature portion 320F, and it can be known, from FIG. 7B(b), that the sensor 520F senses the second feature portion 320F. As such, the position of each element of the moving portion 200 (including the driving structure 210, the target plate 230, and so on) at the time point t can be obtained. Other details as described above may also be included in this embodiment, and will not be redundantly repeated herein.

While all of the embodiments of FIGS. 2A-2B to 7A-7B use two sensors, the case of more sensors may be implemented in a similar manner. When two or more sensors are used, it is possible to determine the position of the moving portion 200 according to sensing results of each sensor even when the instrument is just turned on. Besides, the position of the moving portion 200 may be adjusted such that a particular element corresponds to the position of the closest sensor. Alternatively, the sensors can be arranged at important positions such as a start point, an end point, and a best focus point of the calibration. In addition, even if the driving structure 210 is out of step, the calibration can be performed after the rotation of the driving structure 210 is adjusted according to sensing results of every sensor until the position is accurate. More sensors and/or more feature portions can ensure that positions of more portions of the moving portion 200 are correct, and thus the accuracy of the intraoral scanner calibration is improved. In addition, more sensors and/or more feature portions can reduce the discrimination time.

However, even if only one sensor is used, the calibration device according to the disclosure can perform the calibration. Such embodiments are described hereinafter.

Figure 8A:
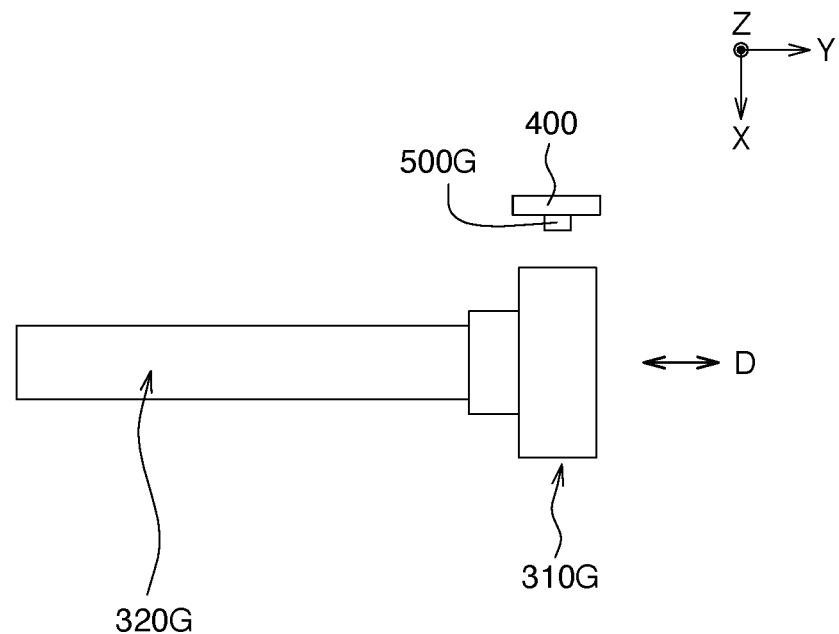
Figure 8B:
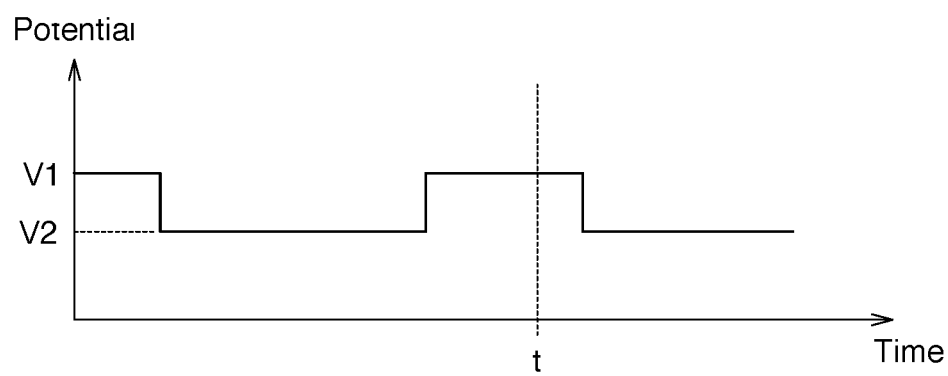

Referring to FIGS. 8A-8B, in this embodiment, the first feature portion 310G and the second feature portion 320G have different cross-sectional sizes. Correspondingly, a single sensor 500G is arranged, and the e sensor 500G is a light sensor. According to sensing results of the first feature portion 310G and the second feature portion 320G by the sensor 500G, the position of the moving portion 200 can be determined. For example, when the moving portion 200 moves forward in the moving direction D (i.e., close to the opening 610, toward the right side of the figure), the sensor 500G obtains the potential change with time as shown in FIG. 8B corresponding to the movement of the position determining portion 220. The first feature portion 310G and the second feature portion 320G generate different potential signals corresponding, for example, to the potential V1 and the potential V2, respectively. From FIG. 8B, according to a signal interval, a corresponding moving distance of the moving portion 200 can be calculated. In addition, it can be known, from FIG. 8B, that which feature portion is sensed by the sensor 500G at the time point t. As such, the position of each element of the moving portion 200 (including the driving structure 210, the target plate 230, and so on) at the time point t can be obtained. Other details as described above may also be included in this embodiment, and will not be redundantly repeated herein.

Figure 9A:
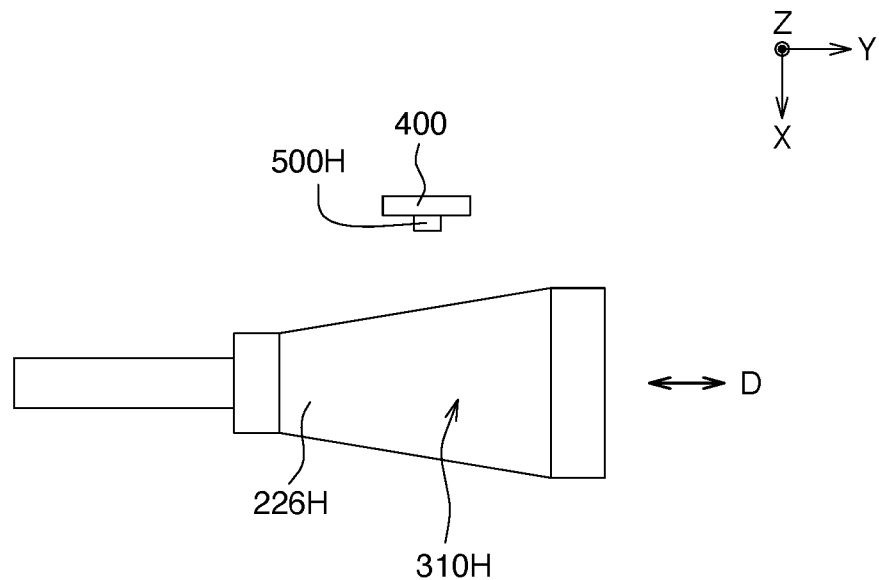
Figure 9B:
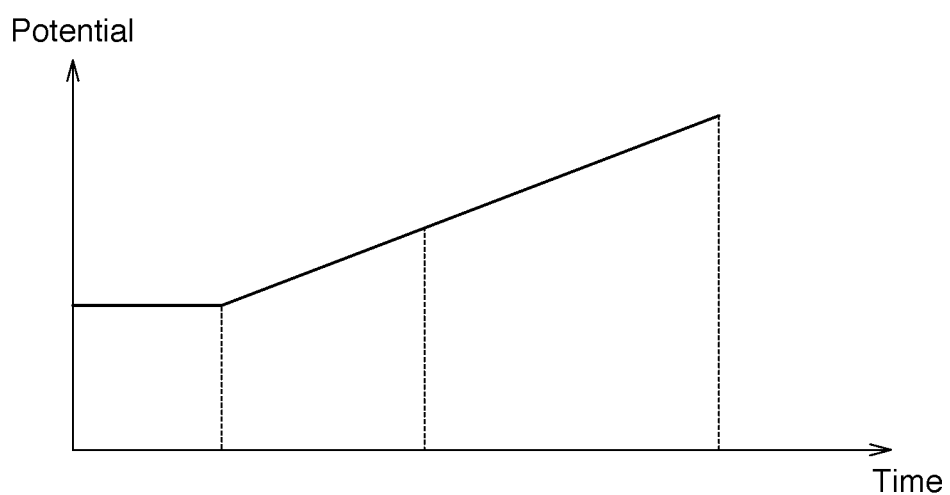

Referring to FIGS. 9A-9B, this embodiment also relates to feature portions of different cross-sectional sizes. In this embodiment, the connecting portion 226H itself has a tapered cross-sectional size, and constitutes a tapered feature portion 310H, which can be regarded as a combination of two or more feature portions. When the position determining portion 220 moves backward in the moving direction D (i.e., away from the opening 610, toward the left side of the figure), the sensor 500H senses a rear end point, a best focus point, and a front end point of the feature portion 310H in sequence at time points t1, t2, and t3. As such, the sensor 500H can be arranged at a position corresponding to the rear end point of the feature portion 310H. If the position determining portion 220 moves backward after the instrument is turned on, and gradually rising potential is measured, it can be determined that the moving direction of the position determining portion 220 is correct, and then the feature portion 310H used for positioning will gradually pass the sensor 500H and be sensed by the sensor 500H. If the position determining portion 220 moves forward after the instrument is turned on, and constant potential is measured, it can be determined that the moving direction of the position determining portion 220 is wrong, and the position determining portion 220 should be rotated in the opposite direction. With such concept, where only one sensor is used, the sensor can be arranged at a particular point corresponding to the position determining portion, and preferably corresponding to an end point of the feature portion used for positioning. Once the instrument is turned on, the sensing result is read while the driving structure 210 moves in a certain direction, the feature portion used for positioning is determined reaching a position of the sensor according to the feature change corresponding to the sensing result, and then the correction can be performed. Even if the driving structure 210 is out of step, the calibration can be performed after the position is accurate. More feature portions can ensure that positions of more portions of the moving portion 200 are correct, and thus the accuracy of the intraoral scanner calibration is improved. Other details as described above may also be included in this embodiment, and will not be redundantly repeated herein.

Figure 10A:
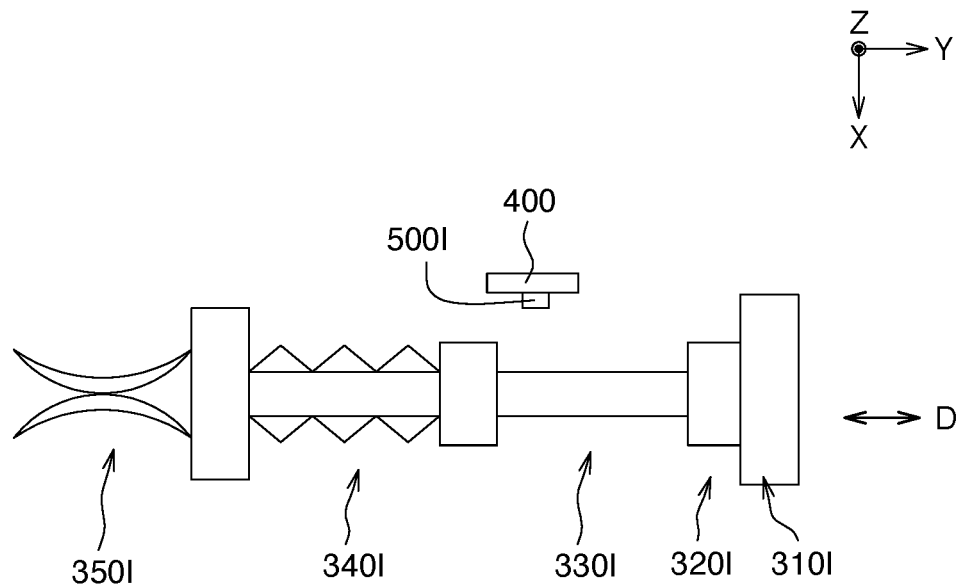
Figure 10B:
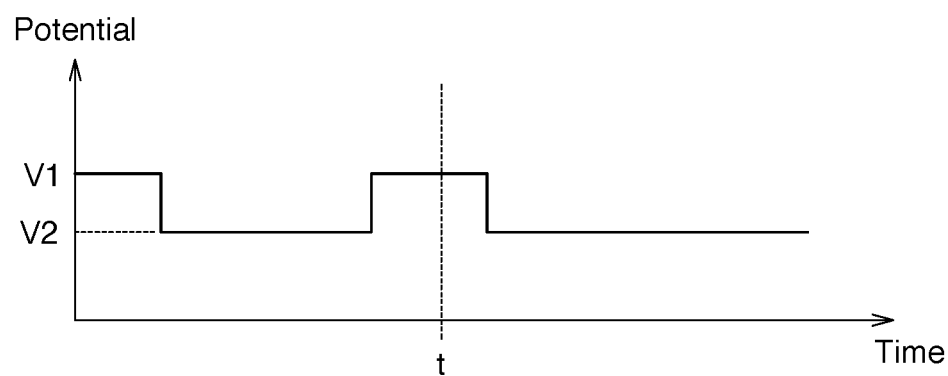

Referring to FIGS. 10A-10B, in this embodiment, the first feature portion 310I, the second feature portion 320I, the third feature portion 330I, the fourth feature portion 340I, and the fifth feature portion 350I have different shapes. Correspondingly, a single sensor 500I is arranged, and the sensor 500I is a light sensor. According to sensing results of any two or more of the first feature portion 310I to the fifth feature portion 350I by the sensor 500I, the position of the moving portion 200 can be determined. For example, when the position determining portion 220 moves forward in the moving direction D (i.e., close to the opening 610, toward the right side of the figure), the sensor 500I obtains the potential change with time as shown in FIG. 10B. The first feature portion 310I to the fifth feature portion 350I generate different potential signals. From FIG. 10B, according to a signal interval, a corresponding moving distance of the moving portion 200 can be calculated. In addition, it can be known, from FIG. 10B, that which feature portion is sensed by the sensor 500I at the time point t. As such, the position of each element of the moving portion 200 (including the driving structure 210, the target plate 230, and so on) at the time point t can be obtained. Other details as described above may also be included in this embodiment, and will not be redundantly repeated herein.

Figure 11A:
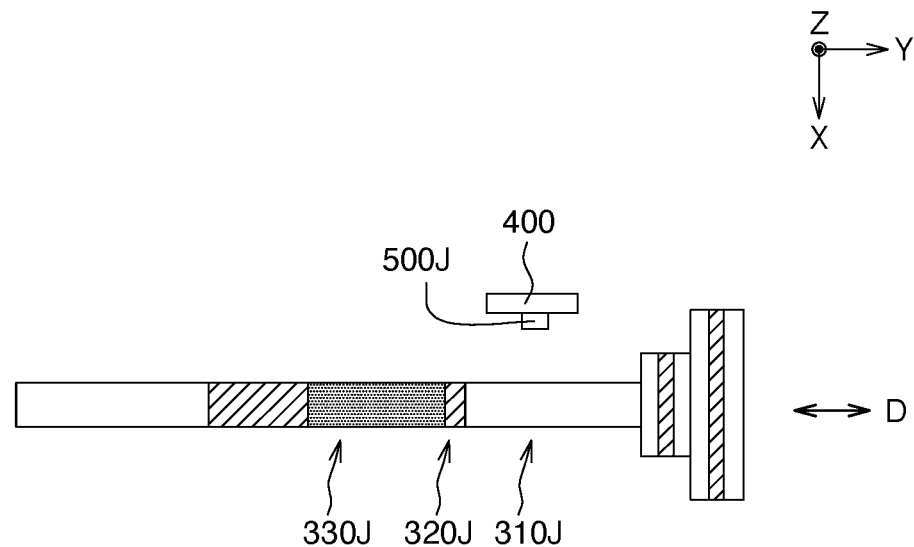
Figure 11B:
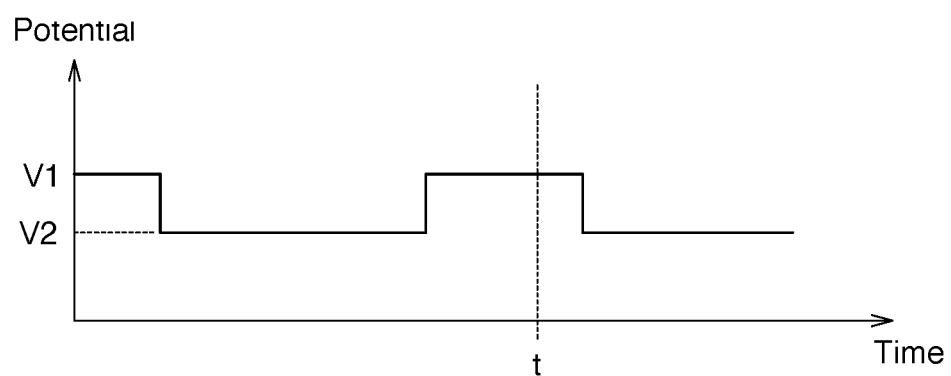

Referring to FIGS. 11A-11B, in this embodiment, the first feature portion 310J, the second feature portion 320J, and the third feature portion 330J have different colors, such as silver, black, and gold, respectively. Correspondingly, a single sensor 500J is arranged, and the sensor 500J is a light sensor. According to sensing results of any two or more of the first feature portion 310J to the third feature portion 330J by the sensor 500J, the position of the moving portion 200 can be determined. For example, when the position determining portion 220 moves forward in the moving direction D (i.e., close to the opening 610, toward the right side of the figure), the sensor 500J obtains the potential change with time as shown in FIG. 11B corresponding to the movement of the position determining portion 220. The first feature portion 310J to the third feature portion 330J generate different potential signals. From FIG. 11B, according to a signal interval, a corresponding moving distance of the moving portion 200 can be calculated. In addition, it can be known, from FIG. 11B, that which feature portion is sensed by the sensor 500J at the time point t. As such, the position of each element of the moving portion 200 (including the driving structure 210, the target plate 230, and so on) at the time point t can be obtained. Other details as described above may also be included in this embodiment, and will not be redundantly repeated herein.

Figure 12A:
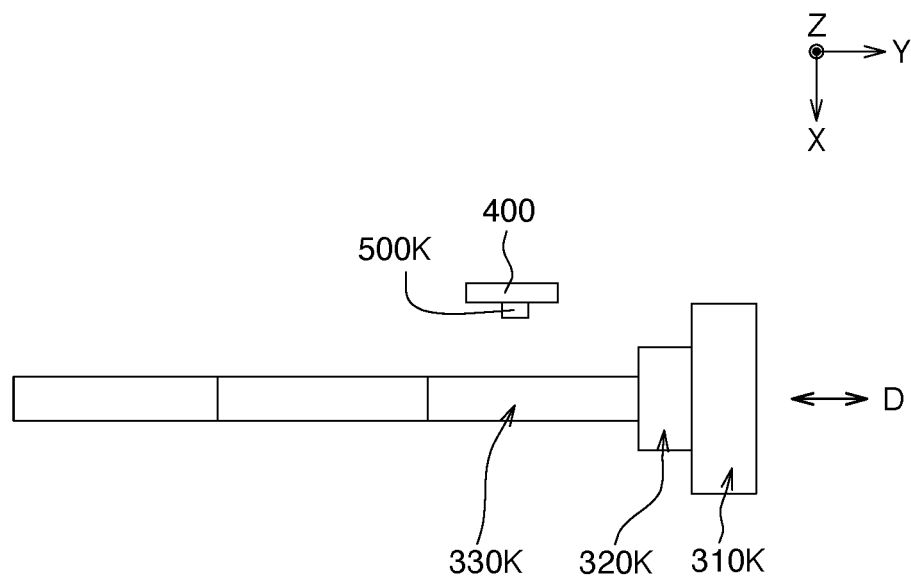
Figure 12B:
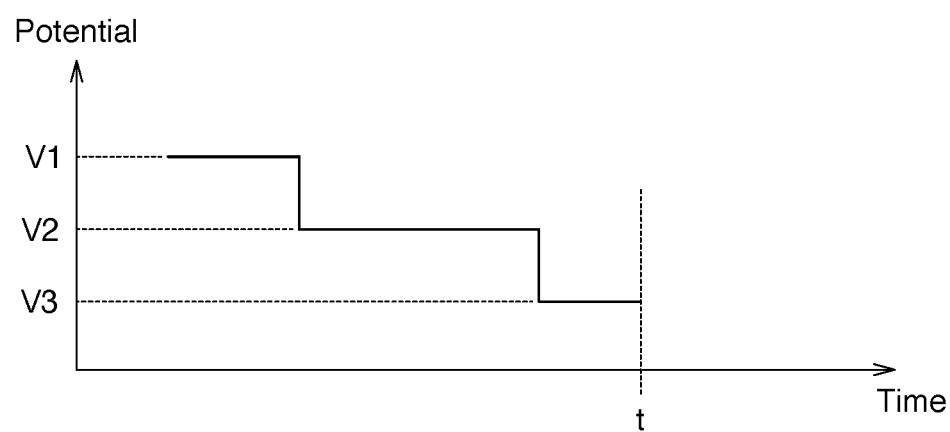

Referring to FIGS. 12A-12B, in this embodiment, the first feature portion 310K, the second feature portion 320K, and the third feature portion 330K have different materials. Correspondingly, a single sensor 500K is arranged, and the sensor 500K is a light sensor. According to sensing results of any two or more of the first feature portion 310K to the third feature portion 330K by the sensor 500K, the position of the moving portion 200 can be determined. For example, when the position determining portion 220 moves forward in the moving direction D (i.e., close to the opening 610, toward the right side of the figure), the sensor 500K obtains the potential change with time as shown in FIG. 12B corresponding to the movement of the position determining portion 220. The first feature portion 310K to the third feature portion 330K generate different potential signals corresponding, for example, to the potential V1, the potential V2, and the potential V3, respectively. From FIG. 12B, according to a signal interval, a corresponding moving distance of the moving portion 200 can be calculated. In addition, it can be known, from FIG. 12B, that which feature portion is sensed by the sensor 500K at the time point t. As such, the position of each element of the moving portion 200 (including the driving structure 210, the target plate 230, and so on) at the time point t can be obtained. Other details as described above may also be included in this embodiment, and will not be redundantly repeated herein.

Figure 13A:
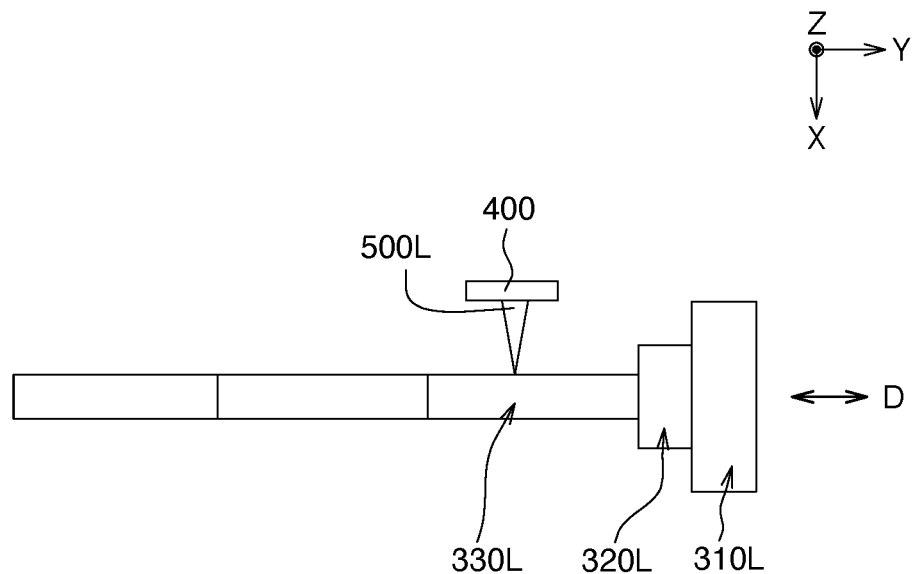
Figure 13B:
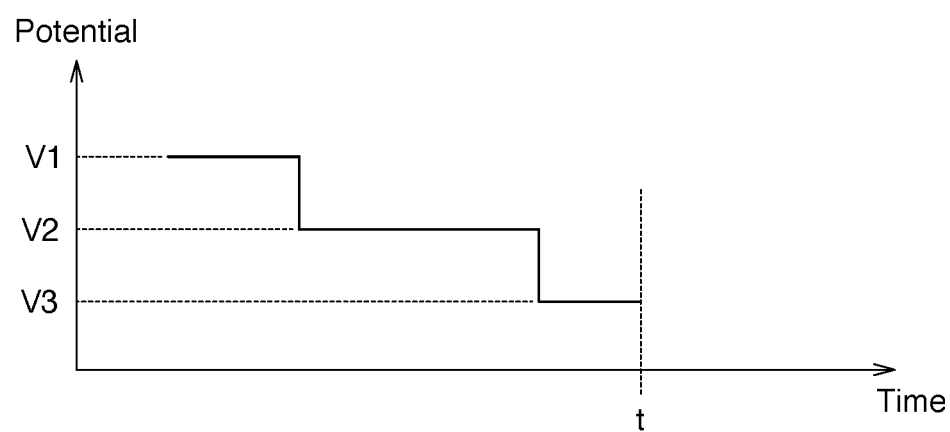

Referring to FIGS. 13A-13B, in this embodiment, the first feature portion 310L, the second feature portion 320L, and the third feature portion 330L have different roughnesses. Correspondingly, a single sensor 500L is arranged, and the sensor 500L is a mechanical sensor. For example, the sensor 500L may use a striker to sense the surface roughness of the contacted portion of the position determining portion 220, but the disclosure is not limited thereto. According to sensing results of any two or more of the first feature portion 310L to the third feature portion 330L by the sensor 500L, the position of the moving portion 200 can be determined. For example, when the position determining portion 220 moves forward in the moving direction D (i.e., close to the opening 610, toward the right side of the figure), the sensor 500L obtains the potential change with time as shown in FIG. 13B corresponding to the movement of the position determining portion 220. The first feature portion 310L to the third feature portion 330L generate different potential signals corresponding, for example, to the potential V1, the potential V2, and the potential V3, respectively. From FIG. 13B, according to a signal interval, a corresponding moving distance of the moving portion 200 can be calculated. In addition, it can be known, from FIG. 13B, that which feature portion is sensed by the sensor 500L at the time point t. As such, the position of each element of the moving portion 200 (including the driving structure 210, the target plate 230, and so on) at the time point t can be obtained. Other details as described above may also be included in this embodiment, and will not be redundantly repeated herein.

Figure 14A:
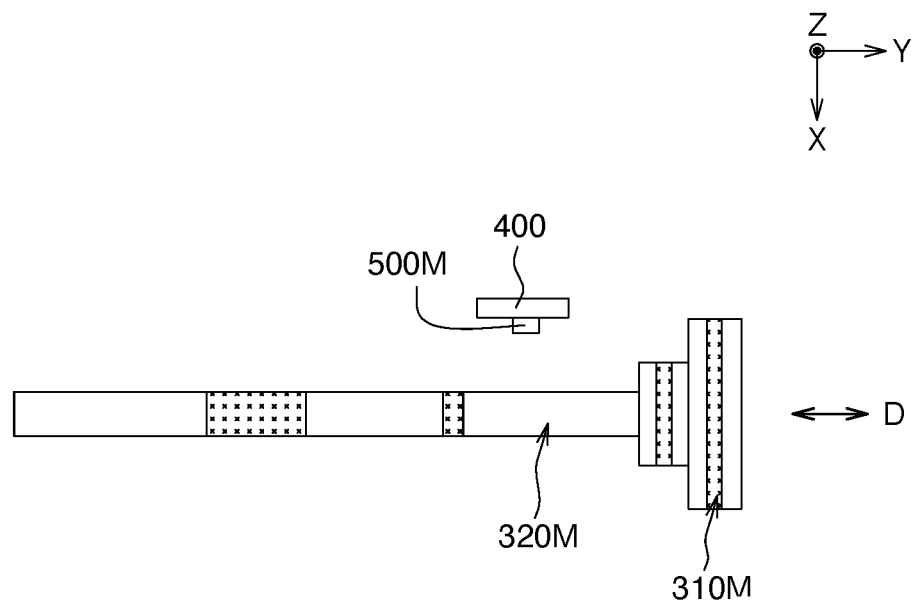
Figure 14B:
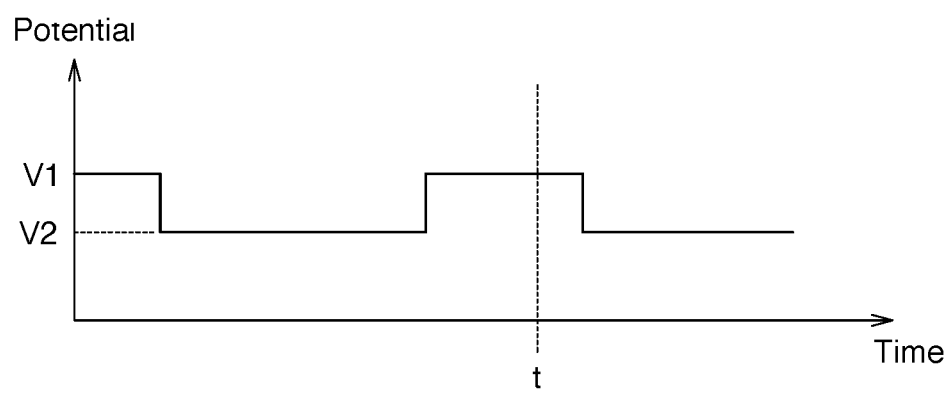

Referring to FIGS. 14A-14B, in this embodiment, the first feature portion 310M and the second feature portion 320M have different magnetic characteristics. Correspondingly, a single sensor 500M is arranged, and the sensor 500M is a magnetic sensor. For example, magnets or electromagnet coils may be arranged on the position determining portion 220, thereby generating different magnetic forces on different portions of the position determining portion 220, but the disclosure is not limited thereto. According to sensing results of the first feature portion 310M and the second feature portion 320M by the sensor 500M, the position of the moving portion 200 can be determined. For example, when the position determining portion 220 moves forward in the moving direction D (i.e., close to the opening 610, toward the right side of the figure), the sensor 500M obtains the potential change with time as shown in FIG. 14B corresponding to the movement of the position determining portion 220. The first feature portion 310M and the second feature portion 320M generate different potential signals corresponding, for example, to the potential V1 and the potential V2, respectively. From FIG. 14B, according to a signal interval, a corresponding moving distance of the moving portion 200 can be calculated. In addition, it can be known, from FIG. 14B, that which feature portion is sensed by the sensor 500I at the time point t. As such, the position of each element of the moving portion 200 (including the driving structure 210, the target plate 230, and so on) at the time point t can be obtained. Other details as described above may also be included in this embodiment, and will not be redundantly repeated herein.

Based on the above, the disclosure provides a calibration device for an intraoral scanner, and its position determining portion is not limited to a screw, but includes feature portions having different features. Since the position determining portion is not limited to a screw, it is not necessary to increase the length of the screw, and thus the deviation of the axis due to increasing of the length of the screw can be prevented. In this disclosure, by using different signals sensed at different feature portions by the sensor(s), position information of the moving portion can be obtained, so as to achieve positioning. More sensors and/or more feature portions can ensure that positions of more portions of the moving portion are correct, and thus the accuracy of the intraoral scanner calibration is improved. In addition, more sensors and/or more feature portions can reduce the discrimination time. However, even if only one sensor is used, the calibration device according to the disclosure can perform the calibration.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A calibration device for an intraoral scanner, comprising:
    a base;

a moving portion disposed on the base, the moving portion being moveable on the base along an extending direction of the calibration device, the moving portion comprising:
   a driving structure;
   a position determining portion coupled to and driven by the driving structure, wherein the position determining portion has a first feature portion and a second feature portion different from the first feature portion; and
   a target plate coupled to the position determining portion;
a circuit board disposed at one side of the moving portion; and
a sensor disposed on the circuit board, the sensor being configured to detect the first feature portion and the second feature portion so as to determine a position of the moving portion, wherein the position of the moving portion is determined according to different electrical signals generated by the sensor when the sensor senses the first feature portion and senses the second feature portion.

2. The calibration device according to claim 1, wherein the position determining portion comprises:
   a screw coupled to the driving structure; and
   an attaching portion coupled to the screw, wherein the target plate is attached to the attaching portion.

3. The calibration device according to claim 2, wherein the position determining portion further comprises:
   a connecting portion connecting the screw and the attaching portion.

4. The calibration device according to claim 2, wherein at least one of the first feature portion and the second feature portion is arranged on the screw.

5. The calibration device according to claim 2, wherein at least one of the first feature portion and the second feature portion is arranged on the attaching portion.

6. The calibration device according to claim 1, wherein the second feature portion is different from the first feature portion in at least one feature selected from the group consisting of a cross-sectional size, a shape, a color, a material, a roughness, and a magnetic characteristic.

7. The calibration device according to claim 1, wherein the electrical signals are potential signals.

8. The calibration device according to claim 1, wherein the position determining portion further has a third feature portion different from the first feature portion and the second feature portion.

9. The calibration device according to claim 1, wherein the sensor is selected from the group consisting of a light sensor, a mechanical sensor, and a magnetic sensor.

10. The calibration device according to claim 1, wherein the circuit board is perpendicular to the base.

11. The calibration device according to claim 1, further comprising:
   a housing receiving the base, the moving portion, the circuit board, and the sensor, the housing having an opening for insertion of the intraoral scanner.

* * * * *